ARTHUR M. SELIGMAN
NORMAN J. ANDERSON
INVENTORS

3,267,451
FLUID FLOW MONITOR

Arthur M. Seligman, 1006 Shenley Drive, Erie, Pa. 16505, and Norman J. Anderson, 1050 W. 9th St., Erie, Pa. 16502
Filed Feb. 15, 1963, Ser. No. 258,726
3 Claims. (Cl. 340—239)

This invention relates to a device which supervises the flow of minute quantities of fluid; it is particularly applicable where the fluid is delivered in separate drops in the case of a liquid, or bubbles in the case of a gas, rather than in a continuous stream. Whenever the flow is interrupted for a predetermined length of time, the device will issue a signal, which can be used to start an alarm, or to initiate automatically corrective measures, or to prevent damage, e.g. by shutting down a machine. The set-up can easily be varied in such a way as to give the signal if the flow continues, rather than discontinues for too long a time.

The invention may especially serve as a monitor for the lubrication of machines and engines, such as compressors, steam or internal combustion engines, to the cylinders of which the lubricant is delivered in quantities from, say, 8 drops per minute to one drop every 2 minutes; the monitor can then, for instance, be set so that, if two consecutive drops fail to come through on time, the alarm would be given.

Figure 1:
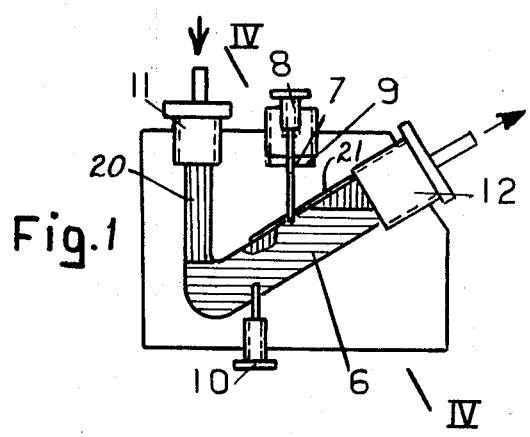
Figure 2:
Figure 3:
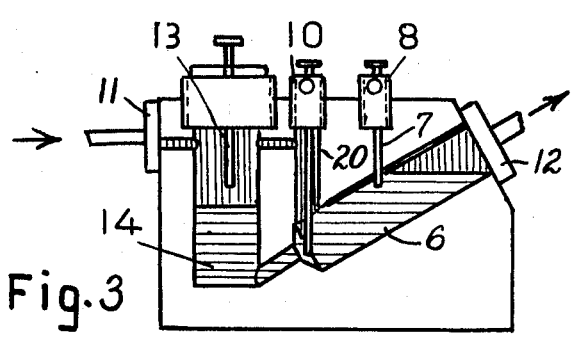
Figure 4:
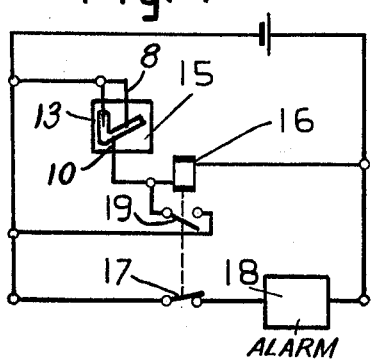

The drawings show two forms of the invention, FIG. 1 depicts the basic form; FIG. 2 is a section taken in plane II—II of FIG. 1; FIG. 3 shows another variation, embodying back-flow protection, which will be explained later on; finally, FIG. 4 is an electric line diagram, showing one possible arrangement of the circuitry. The "working fluid" is indicated by vertical shading, the "sealing liquid" by horizontal shading.

The form of the inventional device shown in FIG. 1 is preferably for the use with petroleum-base oil, which is to be fed into the cylinder of a compressor by a lubricator. It may be conceded that these mechanical lubricators, as a rule, are very reliable and fail very seldom; yet many compressor plants, particularly in natural gas pipe lines, are nowadays fully automatic and are left without attendance for weeks; therefore every precaution must be taken to prevent damage even in the most unlikely events. One possible cause of lubrication failure is, of course, lack of lubricant in the reservoir, for which eventuality a float switch could be provided to give alarm at low liquid level; where the lubricator is driven by a belt, a limit switch may protect against belt break; this would still not protect against a leak in the oil line, in which case the lubricator would work perfectly, but no oil would be delivered into the cylinder; there are other possible reasons for malfunction. In contrast to the devices just described the inventional monitor is installed immediately at the inlet to the cylinder, and thus one single device will react if lubrication should fail at the lubrication point for any reason whatsoever.

Two electrodes are part of an electric circuit. Now when the lubricator delivers a small amount of oil, it will be forced out of the inlet tube, will rise through the sealing liquid and unite with the oil at the top, and at the same time, due to the incompressibility of the liquid, force a corresponding amount of oil through the outlet tube to the lubrication point. On the way up, however, the oil drop must pass between the electrodes and thereby momentarily interrupt the current; this interruption is the signal which will be used to supervise the function of the lubricator, as will be explained later.

The device consists essentially of a block of plastic material, which has a V-shaped cavity consisting of two legs 20 and 6, the latter has the form of a cylindrical duct 6 with an inclined axis (say 30 to 45° against the horizontal); one electrode 7 is immersed from above approximately in the middle of the duct and has preferably the form of a needle, whose position can be adjusted by means of a threaded connection 8 and a packing 9; the other electrode 10 may be located at any convenient spot, but must terminate near the bottom. Connections 11 from the lubricator and 12 to the cylinder are provided as described before, and the cavity 6 is partly filled with mercury as the sealing liquid, and it has preferably a cross-section (taken along line II—II) as shown in FIG. 2, which is essentially circular but with a notch 21 on top. Now, bubbles of working liquid—or bubbles of gas, if such is to be monitored—will crawl along the notch and by doing so interrupt the circuit. The depth by which the electrode 7 must penetrate into the sealing liquid depends on the size of the drops, the viscosity of both fluids, and the voltage; if it sticks out too far, the drop may not be thick enough to envelop it and break the contact; if it does not stick out far enough, some of the working fluid may adhere to it permanently and prevent contact with the sealing fluid. It is, however, easy to adjust the needle according to the prevailing conditions and obtain a reliable and clear signal.

With an electrolyte as sealing fluid, of course, alternating current must be used, whereas mercury will also allow direct current and will require only a very low voltage.

The vessel may also be made of metal, e.g. if high pressure calls for high strength material, or where one of the fluids is incompatible with plastics, such as synthetic lubricants; in this case the interrupting electrode must be insulated from the wall, which, however, does not present any serious difficulty; for instance a construction similar to the well known automobile spark plug may be resorted to.

The purpose of the variation as per FIG. 3 is to provide an additional protection in the case of a line break where oil must be supplied to a pressurized part, such as a compressor cylinder. Ordinarily check valves are installed near the cylinder to prevent back flow; however, such valves are not too reliable, and in case of a leak pressure from the cylinder could drive the liquids, oil as well as mercury, back and eventually through the break in the line out of the system. The circuit would then be permanently interrupted between the terminals 8 and 10 and no alarm be given. To avoid this kind of malfunction an enlarged chamber 14 is provided on the inlet side and in it an auxiliary terminal 13 as such a height that it will dip into the sealing fluid, if it should be driven back so far as to lose contact with terminal 8; terminals 8 and 13 are electrically connected; thus, in case of back pressure not held up by the check valve the mercury will be caught in chamber 14, while oil, and possibly later gas, bubbles can rise through leg 20 towards the inlet pipe; with the arrangement as shown such bubbles cannot touch the tip of electrode 13, so that a permanent contact is established between electrodes 10 and 13, and the alarm will be given properly. Alarm would also be initiated, if through some incident the monitor were brought out of its horizontal alignment.

There are several ways to convert the output signal of the monitor into an actual alarm, one of which is explained in the following and illustrated in FIG. 4. In the most common case of application on a lubricator, as just described, if no oil drop passes the electrode, the current will flow continuously. This will energize the coil 16 of a relay and will tend to open the normally closed contact 17; however, the relay is constructed with an "on-delay," that is the contact will only be broken after the coil is energized for a predetermined length of time; however, in as much as no "off-delay" is built into the relay, the contact will make instantaneously whenever the coil is deenergized; also the timing mechanism will return to its initial position immediately, if the coil is deenergized during the timing interval. Timing relays with this mode of operation are standard commercial items. Thus, if a drop of oil passes by the electrode and interrupts the current before the timing cycle is completed, contact 17 will remain closed, and nothing will happen; however, if the oil drop should fail to arrive during the predetermined interval after the previous drop, contact 17 will be broken and the current to the alarm device 18 will be cut off. The latter is preferably of a 'fail safe" design, that is, it will initiate the alarm if the input current fails; alarm devices of that nature are also readily available. Unless a locking feature is built into the device itself, an additional contact 19 may be provided in the relay, time delayed in the same manner as contact 17, but normally open; once this latter contact is closed, it will hold the relay in the energized position, and thus contact 17 will remain open and the alarm kept going, even if subsequently a drop of oil should be delivered and the contact within the monitor 15 be broken, that is if the lubricator should work, but not fast enough. Contacts 17 and 19, of course, may be mechanically interconnected or, as a matter of fact, they can be combined into one double-throw contactor. The drop separates the sealing liquid from the electrode during a short, but measurable time, which among other things depend on the size of the drop. On the other hand, the time required for resetting the timer is also finite and regulable. It can, thus, be so arranged that drops below a predetermined size will not be effective, in other words the alarm will also be given, if the drops, although arriving on time, were too small.

We claim:

1. A monitor for a small flow of an electrically nonconductive working fluid, comprising a chamber having two generally tubular-shaped legs, one leg of said two generally tubular shaped legs being generally vertical and having a first upper portion and a first lower portion, the other leg of said two generally tubular-shaped legs being inclined against the horizontal and having a second lower portion and a second upper portion, said first upper portion having an inlet for said working fluid, said first lower portion and said second lower portion joined at an angle to form a first junction, said second upper portion having an outlet for the working fluid, said chamber having a cross-section of sufficient area to allow unrestricted flow of said working fluid and being provided with a notch along the upper side of the inclined other leg, a first electrode penetrating into the chamber, a second electrode penetrating electrically insulated through the wall of said other leg into said notch in a downward direction at an angle to the axis of the second leg, and an electrically conductive sealing liquid occupying the lower part of said chamber and at a level in contact with the first and second electrode for providing an electrical circuit therebetween.

2. A monitor as in claim 1 and further comprising a third leg having a substantially larger cross-section than said two generally tubular-shaped legs, said third leg being generally vertical and having a third upper portion and a third lower portion, said third upper portion having an inlet for said working fluid, said third lower portion joined at an angle to said chamber at that first lower portion and said second lower portion to form a second junction, said second junction being at a lower level than said first junction, and a third electrode penetrating downwardly into said third leg to a depth above the normal level of the sealing liquid and adapted to be externally connected to the second electrode.

3. A monitor as in claim 1 and further including an electric relay having a coil connected in series with said first and second electrodes and a time-delayed contactor controlled by said coil, and an alarm means connected in series with said contactor to provide a warning alarm when said circuit is not broken by the passing of said working fluid over said second electrode within a predetermined length of time.

References Cited by the Examiner

UNITED STATES PATENTS

| | | | |
|---|---|---|---|
| 2,483,363 | 9/1949 | De Villiers | 184—96 |
| 2,577,137 | 12/1951 | Low | 317—141 |
| 2,594,668 | 4/1952 | Mannal | 73—194 |
| 2,683,986 | 7/1954 | Bartlett et al. | |
| 2,689,627 | 9/1954 | Woog | 184—96 |
| 2,719,287 | 9/1955 | Bartlett | 340—253 X |
| 2,920,159 | 1/1960 | Snyder | 200—81.9 |
| 3,033,023 | 5/1962 | Hooper et al. | 73—194 X |

NEIL C. READ, *Primary Examiner.*

D. K. MYER, *Assistant Examiner.*